UNITED STATES PATENT OFFICE.

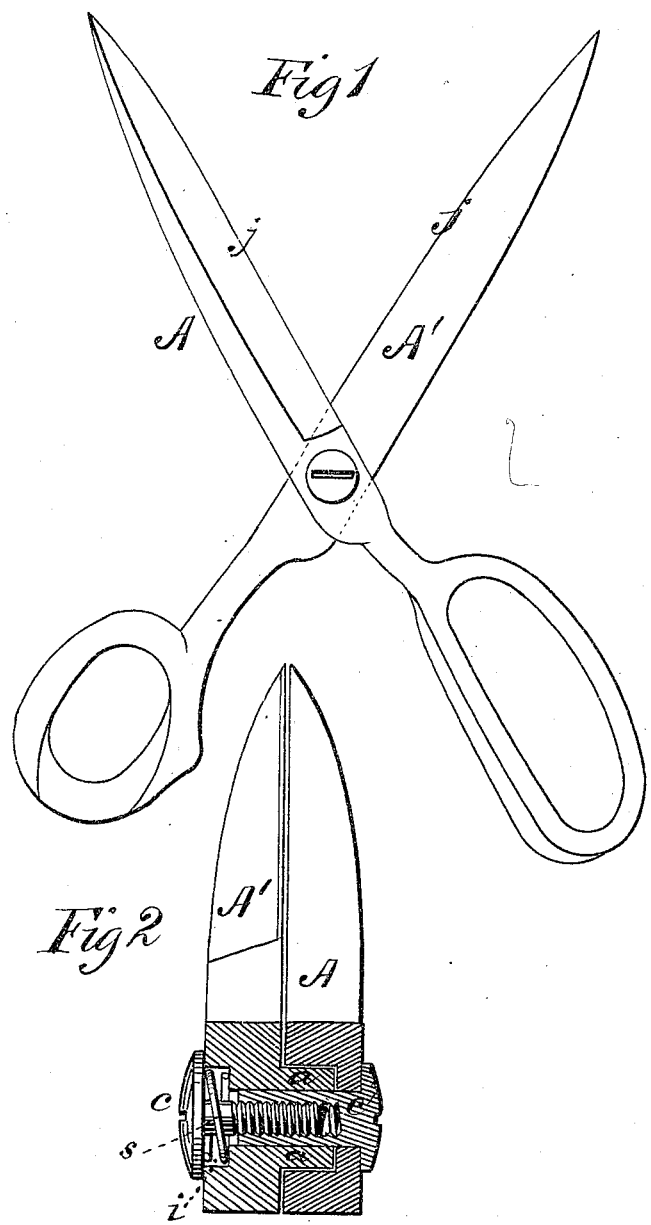

EDWARD PARKER, OF PLYMOUTH, ASSIGNOR TO THE NIAGARA SHEAR COMPANY, OF THOMASTON, CONNECTICUT.

IMPROVEMENT IN SHEARS.

Specification forming part of Letters Patent No. 174,846, dated March 14, 1876; application filed August 21, 1875.

*To all whom it may concern:*

Be it known that I, EDWARD PARKER, of Plymouth, in the county of Litchfield and State of Connecticut, have invented a new and valuable Improvement in Shears; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a plan view of my shears, and Fig. 2 is a sectional detail view of the same.

This invention has relation to improvements in shears, scissors, and other like cutting implements.

The nature of the invention consists, mainly, in a spring recessed into one of the blades, and interposed between the head of a screw-threaded fulcrum-pin, which is passed through from one side of the blades, and the heel of a second pin passing through the blades from the other side and screwed into the first, whereby an elastic union of the blades of the scissors or shears is obtained, causing them to work easily the one past the other, and thus preventing the edges from wearing round by the attrition of the one upon the other, as will be hereinafter more fully explained and claimed.

In the annexed drawings, the letters A A' designate the blades of a pair of shears, in connection with which I propose to illustrate my invention. One of these blades, A, is provided with a cylindrical recess adapted to receive an annular raised shoulder, a, of corresponding shape upon blade A', which latter is also provided with a comparatively shallow recess, i, upon its outer surface, for a purpose hereinafter explained. These blades are held in contact by means of a pivot-screw, c, which is passed through registering perforations therein, and is screwed into a tubular threaded screw, c', which is passed from the opposite direction through the blades.

The screws c c' are not designed to clamp the blades tightly together, as by this means the frictional contact of their edges, whereby the muscles of the hand are very much fatigued, and the cutting-edges rapidly rounded, would in no manner be obviated; but in order that a close but yielding contact of these edges may be attained, I interpose a spring, s, of suitable strength between the head of screw c and the end of screw c', which is compressed when the former screw is forced up into the latter against the bottom of recess i of blade A', the effect of which is to clamp the edges of the blades together with the full force of the spring, but yet yieldingly, so that the blades shall work smoothly past and over each other, effectually preventing the one from cutting away and rounding the edges of the other, and doing away with the fatigue occasioned by the use of the ordinary shears.

When the blades of the shears vibrate toward each other in the act of cutting a fabric, spring s will be infinitesimally compressed, and the cutting-edges j of the said blades will pass each other in very close but without direct contact, thus greatly facilitating the operation of dividing a material, and effectually preventing the dulling of the cutting-edges.

What I claim as new, and desire to secure by Letters Patent, is—

The blade A', provided with the recess i and flange a, in combination with the recessed-blade A, inclosed spring s, and retaining screws c c', substantially as and for the purpose set forth.

In testimony that I claim the above I have hereunto subscribed my name in the presence of two witnesses.

EDWARD PARKER.

Witnesses:
APOLLOS MARKHAM,
LUCY M. ANBRUS.